United States Patent
Shimada

(10) Patent No.: US 8,664,500 B2
(45) Date of Patent: Mar. 4, 2014

(54) MUSICAL INSTRUMENT STAND

(75) Inventor: Masahiro Shimada, Nagoya (JP)

(73) Assignee: Hoshino Gakki Co., Ltd., Nagoya (JP)

( * ) Notice: Subject to any disclaimer, the term of this patent is extended or adjusted under 35 U.S.C. 154(b) by 152 days.

(21) Appl. No.: 13/303,155

(22) Filed: Nov. 23, 2011

(65) Prior Publication Data

US 2013/0042745 A1 Feb. 21, 2013

(30) Foreign Application Priority Data

Aug. 17, 2011 (JP) ................................ 2011-178489

(51) Int. Cl.
G10D 13/02 (2006.01)

(52) U.S. Cl.
USPC ............................................ 84/421; 248/170

(58) Field of Classification Search
USPC ........................................................ 84/421
See application file for complete search history.

(56) References Cited

U.S. PATENT DOCUMENTS

| | | | |
|---|---|---|---|
| 4,988,064 A | | 1/1991 | Hoshino |
| 5,054,357 A | * | 10/1991 | Pyle ................. 84/421 |
| 5,062,606 A | * | 11/1991 | Hoshino ............... 248/171 |
| 5,072,910 A | | 12/1991 | May |
| 5,165,635 A | * | 11/1992 | Hoshino ............... 248/169 |
| 5,691,492 A | * | 11/1997 | May ................. 84/421 |
| 6,028,257 A | * | 2/2000 | May ................. 84/421 |
| 7,703,725 B2 | | 4/2010 | May |
| 2010/0116121 A1 | | 5/2010 | Eason |
| 2013/0042745 A1 | * | 2/2013 | Shimada ............ 84/421 |

FOREIGN PATENT DOCUMENTS

| | | |
|---|---|---|
| JP | 62-016894 U | 1/1987 |
| JP | 01-168099 U | 11/1989 |
| JP | 2008-185174 A | 8/2008 |
| JP | 2010-525418 A | 7/2010 |

* cited by examiner

Primary Examiner — Robert W Horn

(57) ABSTRACT

A drum stand includes a center pipe, a fixed collar, a first movable collar, a second movable collar, legs, and stays. The fixed collar is secured to the lower end of the center pipe. The first movable collar and the second movable collar are slidably fitted to the center pipe. Legs of a first type are pivotally coupled to the first movable collar. A leg of a second type is pivotally coupled to the second movable collar. Stays of a first type are pivotally coupled to the second movable collar. A stay of a second type is pivotally coupled to the fixed collar.

11 Claims, 10 Drawing Sheets

MUSICAL INSTRUMENT STAND

BACKGROUND OF THE INVENTION

The present invention relates to a musical instrument stand used for mounting a musical instrument such as a marching drum.

In the spectators' stand of a stadium, seats are arranged in rows forming stairs from the field toward the outside of the stadium. In the stadium, marching drum stands (hereinafter, referred to as drum stands) are often mounted on the seats of the spectators' stand, and the marching drums are played while cheering. With this as a background, some drum stands that can be placed not only on a flat ground, but also across a step such as a stair have been proposed.

For example, according to a drum stand 130 disclosed in U.S. Pat. No. 5,072,910, a pair of semi-circular upper collars 131a, 131b are slidably fitted to a front circumferential surface 133a and a rear circumferential surface 133b of a center pipe 133, respectively, as shown in FIG. 10. Also, a pair of semi-circular lower collars 132a, 132b are slidably fitted to the front circumferential surface 133a and the rear circumferential surface 133b of the center pipe 133, respectively. A certain leg 134 and a stay 135, which is coupled to the leg 134, are coupled to the upper collar 131b and the lower collar 132b, which slide along the rear circumferential surface 133b of the center pipe 133. Also, remaining two legs 136 and stays 137, which are coupled to the legs 136, are coupled to the upper collar 131a and the lower collar 132a, which slide along the front circumferential surface 133a of the center pipe 133.

According to a drum stand 140 shown in FIG. 11, fixed collars 142a, 142b are fitted to the middle portion and the lower end of a center pipe 141, respectively. Also, movable collars 143a, 143b are slidably fitted to the center pipe 141 between the fixed collars 142a, 142b. Relatively long two legs 144 and stays 145, which are connected to the legs 144, are coupled to the fixed collars 142a, 142b, respectively. The stays 145 are slidably coupled to the legs 144 via rings 145a. A relatively short leg 146 and a stay 147, which is coupled to the leg 146, are coupled to the movable collars 143a, 143b, respectively. The stay 147 is pivotally coupled to the middle of the leg 146 via a coupling pin 147a. The drum stands 130, 140 shown in FIGS. 10 and 11 are configured such that the height of the certain leg among three legs forming a tripod structure can be adjusted independently of the other legs.

Furthermore, according to a drum stand 150 disclosed in U.S. Pat. No. 7,703,725, an extension plate 152 is supported to be slidable with respect to a certain leg 151a among three legs 151 as shown in FIG. 12. The drum stand 150 is used with the three legs 151 set to the same length on a flat ground. At the spectators' stand of the stadium, the drum stand 150 is used with the leg 151a oriented toward the field (right side in FIG. 12), and the distal end 152a of the extension plate 152 extended until it reaches a seat surface SE of the spectators' stand. That is, the drum stand 150 disclosed in this publication is configured such that the length of the certain leg 151a among three legs 151, which form the tripod structure, can be adjusted independently of the other legs.

However, in the cases of the drum stands 130, 140 disclosed in FIGS. 10 and 11, the number of manipulated portions N is increased that are manipulated when selectively opening and closing the legs 134, 136, 144, 146 with respect to the center pipe 133, 141, and when adjusting the height of the legs 134, 146 in accordance with the location. Therefore, in addition to the problem that manipulations for selectively opening and closing the drum stands 130, 140 and placing the drum stands 130, 140 are complicated, the number of components is increased, thereby increasing the manufacturing costs.

In the case of the drum stand 150 shown in FIG. 12, since the length of only the certain leg 151a among the three legs 151 can be adjusted, it is difficult to place the drum stand 150 across a step. Also, even in the drum stand 150 shown in FIG. 12, since the leg structure for slidably supporting the extension plate 152 with respect to the leg 151a is complicated and the number of components is increased, the manufacturing costs are increased.

SUMMARY OF THE INVENTION

Accordingly, it is an objective of the present invention to provide a musical instrument stand that is easily manipulated, and the heights of the legs are easily adjusted in accordance with the location.

To achieve the foregoing objective and in accordance with one aspect of the present invention, a musical instrument stand used for mounting a musical instrument is provided that includes a center pipe extending in a vertical direction, a lower collar fitted to a lower end of the center pipe, a first movable collar slidably fitted to the center pipe, a second movable collar slidably fitted to the center pipe, at least three legs assembled on the center pipe to be selectively opened and closed, and at least three stays respectively coupled to the legs. The second movable collar is arranged below the first movable collar. The at least three legs include a leg of a first type, which is pivotally coupled to the first movable collar, and a leg of a second type, which is pivotally coupled to the second movable collar. The at least three stays include a stay of a first type, which is coupled to the leg of the first type and is pivotally coupled to the second collar, and a stay of a second type is coupled to the leg of the second type and is pivotally coupled to the lower collar.

In accordance with a second aspect of the present invention, a musical instrument stand used for mounting a musical instrument is provide that includes a center pipe extending in a vertical direction, at least three legs assembled on the center pipe to be selectively opened and closed, at least three stays respectively coupled to the legs, and an overturning prevention device fitted to the center pipe that prevents the musical instrument stand from falling over. The position in height of the certain leg among the at least three legs is capable of being adjusted independently of the other legs. The overturning prevention device is adapted to engage a structure in the vicinity of the location of the musical instrument stand to prevent the musical instrument stand from falling over.

DETAILED DESCRIPTION OF THE PREFERRED EMBODIMENTS

A musical instrument stand according to one embodiment of the present invention will now be described with reference to FIGS. 1 to 6. The musical instrument stand is used for mounting a marching drum, which is a snare drum in this embodiment.

Figure 1:
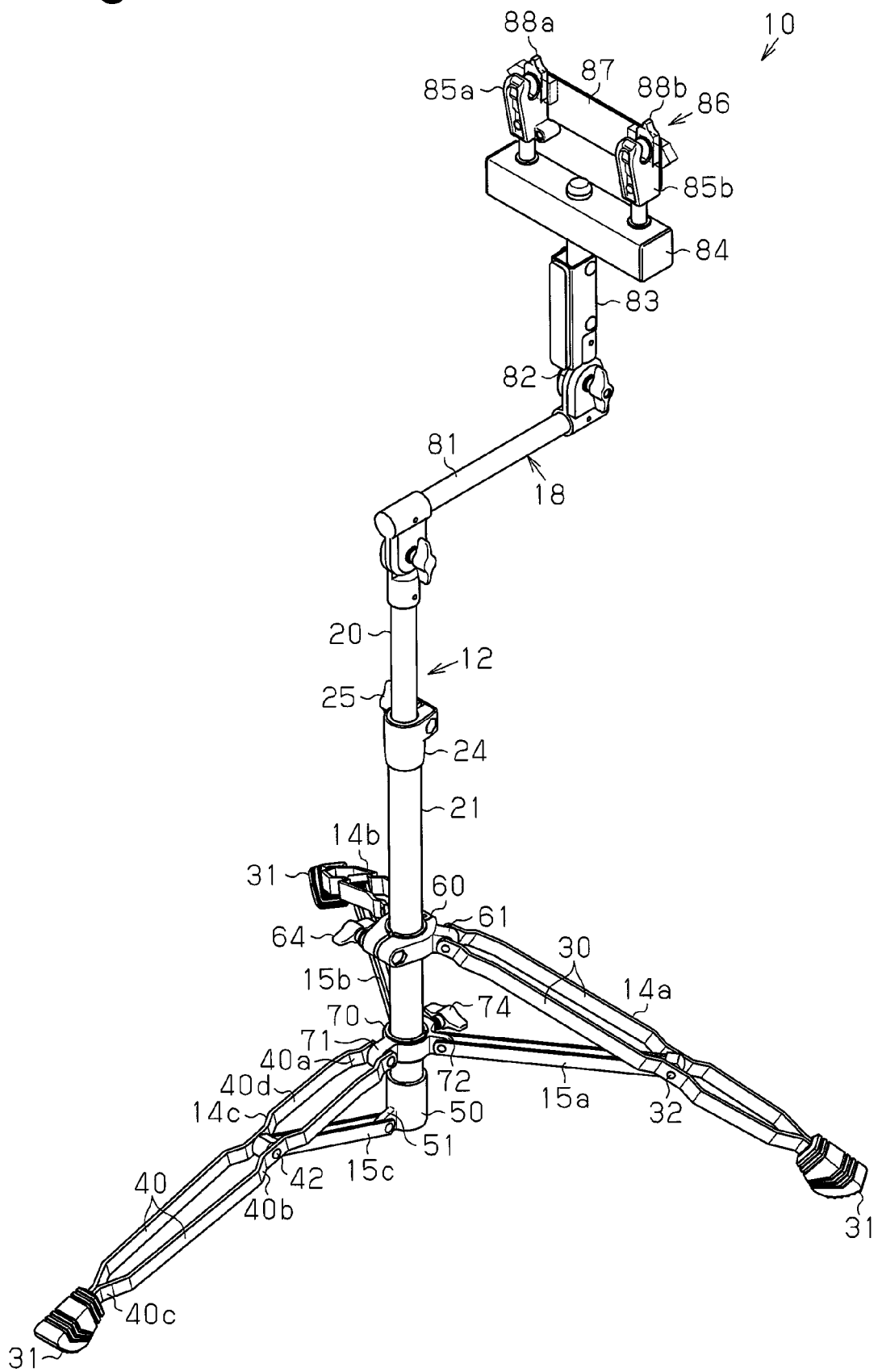
FIG. 1 is a perspective view illustrating an entire drum stand according to one embodiment of the present invention.
Figure 2:
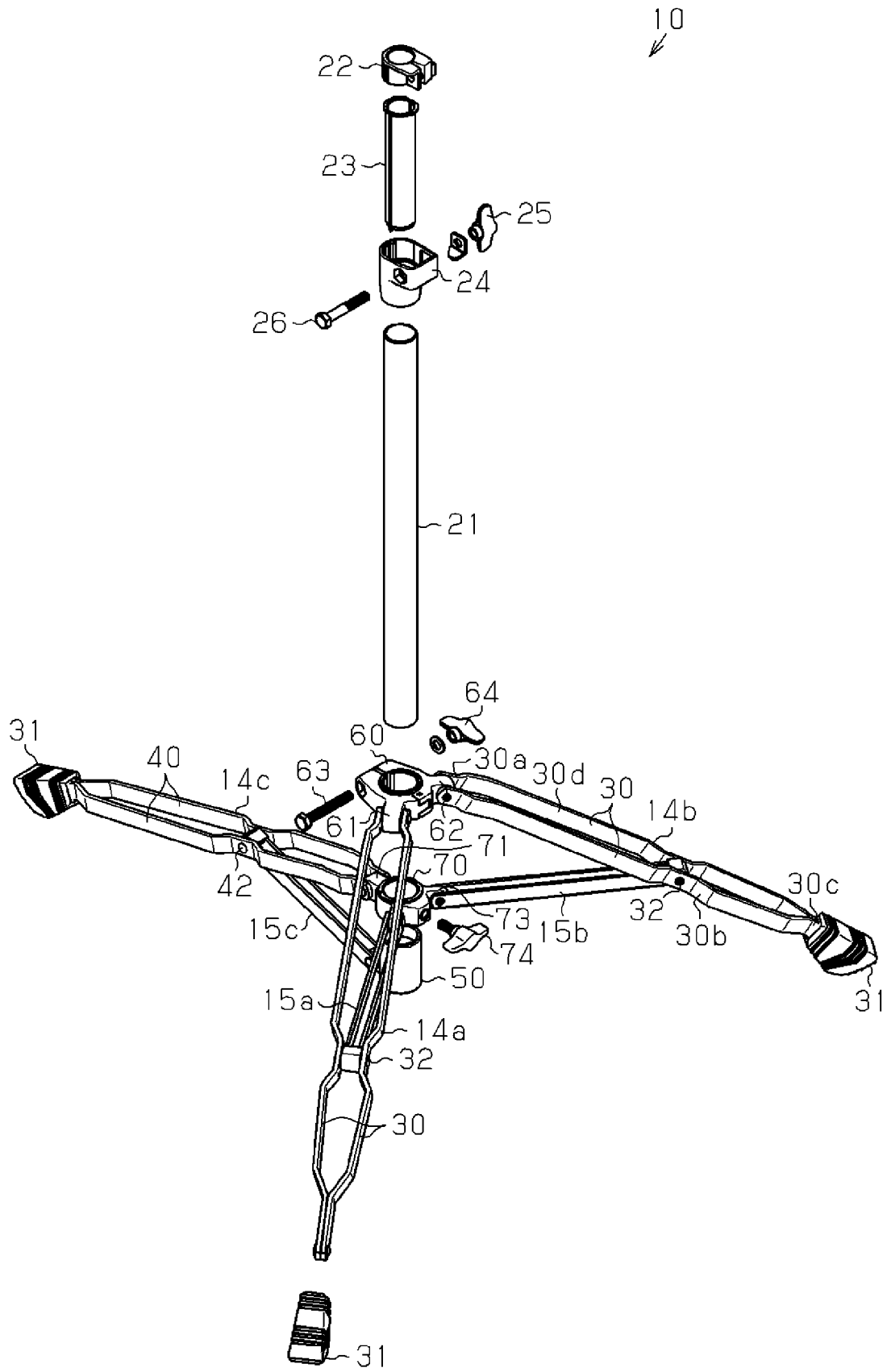
FIG. 2 is an exploded perspective view illustrating the drum stand.

As shown in FIGS. 1 and 2, a drum stand 10 includes a center pipe 12, which extends in the vertical direction, legs 14a, 14b, 14c, stays 15a, 15b, 15c, and an arm 18. The center pipe 12 is formed by an upper pipe 20 and a lower pipe 21. The upper pipe 20 is slidably assembled to the lower pipe 21.

Two types of bushes 22, 23 and a support collar 24 are mounted on the coupling portion of the pipes 20, 21. A T-nut 25 and a bolt 26 that is screwed in the T-nut 25 are attached to the side portion of the support collar 24. Loosening the T-nut 25 allows the upper pipe 20 to be slidable with respect to the lower pipe 21, and the height of the entire drum stand 10 becomes adjustable. Tightening the T-nut 25 restricts the upper pipe 20 from sliding with respect to the lower pipe 21, thus securing the height of the entire drum stand 10.

Legs of a first type 14a, 14b are each formed of a pair of leg plates 30 having a proximal portion 30a, a middle portion 30b, and a distal end portion 30c bent into predetermined shapes. The pair of leg plates 30 are arranged to face each other and assembled integrally with each other. A gap is formed between each pair of leg plates 30 and extends from the proximal portion 30a to the middle portion 30b. The gaps serve as spaces 30d for accommodating stays of a first type 15a, 15b when the stays of the first type 15a, 15b are closed with respect to the lower pipe 21. A rubber stopper 31 is fitted to the distal end of each of the legs of the first type 14a, 14b. The stays of the first type 15a, 15b are pivotally coupled to the legs of the first type 14a, 14b, respectively, via coupling shafts 32.

A leg of a second type 14c is formed of a pair of leg plates 40 having a proximal portion 40a, a middle portion 40b, and a distal end portion 40c bent into predetermined shapes. The pair of leg plates 40 are arranged to face each other and are assembled integrally with each other. A gap is formed between the leg plates 40 and extends from the proximal portion 40a to the middle portion 40b. The gap serves as a space 40d for accommodating a stay of a second type 15c when the second stay 15c is closed with respect to the lower pipe 21. Another stopper 31 is also fitted to the distal end of the leg 14c. The stay of the second type 15c is pivotally coupled to the second leg 14c via a coupling shaft 42. The coupling positions of the stays of the first type 15a, 15b with respect to the legs of the first type 14a, 14b are closer to the distal ends of the associated legs 14a, 14b than the coupling position of the stay of the second type 15c with respect to the associated leg 14c.

The legs 14a, 14b, 14c and the stays 15a, 15b, 15c are assembled to the lower pipe 21 to be selectively opened and closed via lower collars, which are a fixed collar 50 and a pair of movable collars 60, 70. The fixed collar 50 is fitted to the lower end of the lower pipe 21 from below and is fixed. The fixed collar 50 includes a stay coupling protrusion 51. The stay coupling protrusion 51 is located on the circumferential surface of the fixed collar 50. The stay coupling protrusion 51 projects radially from the axis of the fixed collar 50. The fixed collar 50 is formed into a cylindrical shape that is longer than the movable collars 60, 70 in the vertical direction.

The pair of movable collars 60, 70 are arranged above the fixed collar 50, and are fitted to the lower pipe 21 to be slidable along the axis of the lower pipe 21. Among the pair of movable collars 60, 70, a second movable collar 70 is arranged lower than a first movable collar 60. The second movable collar 70 is slidable with respect to the lower pipe 21 between the fixed collar 50 and the first movable collar 60. More specifically, the second movable collar 70 is slidable along the entire length from the upper end of the fixed collar 50 to the lower end of the first movable collar 60.

The first movable collar 60 includes two leg coupling protrusions 61, 62. The leg coupling protrusions 61, 62 are arranged at an interval on the circumferential surface of the first movable collar 60. The leg coupling protrusions 61, 62 project radially from the axis of the first movable collar 60. A bolt 63 and a T-nut 64 that is screwed to the distal end of the bolt 63 are mounted on the end of the first movable collar 60 opposite to the leg coupling protrusions 61, 62. The T-nut 64 is manipulated when adjusting or fixing the mounting position of the first movable collar 60 with respect to the lower pipe 21, that is, the height of the first movable collar 60.

The second movable collar 70 includes a leg coupling protrusion 71, and two stay coupling protrusions 72, 73. The leg coupling protrusion 71 and the stay coupling protrusions 72, 73 are arranged at equal angular intervals on the circumferential surface of the second movable collar 70. The leg coupling protrusion 71 and the stay coupling protrusions 72, 73 project radially from the axis of the second movable collar 70. A T-bolt 74 is screwed to the second movable collar 70 between the stay coupling protrusions 72, 73. The T-bolt 74 is manipulated when adjusting or fixing the mounting position of the second movable collar 70 with respect to the lower pipe 21, that is, the height of the second movable collar 70.

The legs 14a, 14b, 14c and the stays 15a, 15b, 15c are coupled to the first movable collar 60, the second movable collar 70, and the fixed collar 50 as described below. That is, the proximal ends of the first legs 14a, 14b are pivotally coupled to the leg coupling protrusions 61, 62 of the first movable collar 60, respectively. The two first legs 14a, 14b are arranged adjacent to each other. The proximal ends of the first stays 15a, 15b are pivotally coupled to the stay coupling protrusions 72, 73 of the second movable collar 70, respectively. Also, the proximal end of the second leg 14c is pivotally coupled to the leg coupling protrusion 71 of the second movable collar 70. The proximal end of the second stay 15c is pivotally coupled to the stay coupling protrusion 51 of the fixed collar 50. As described above, the drum stand 10 has a tripod structure including the two first legs 14a, 14b and the single second leg 14c.

Figure 5:
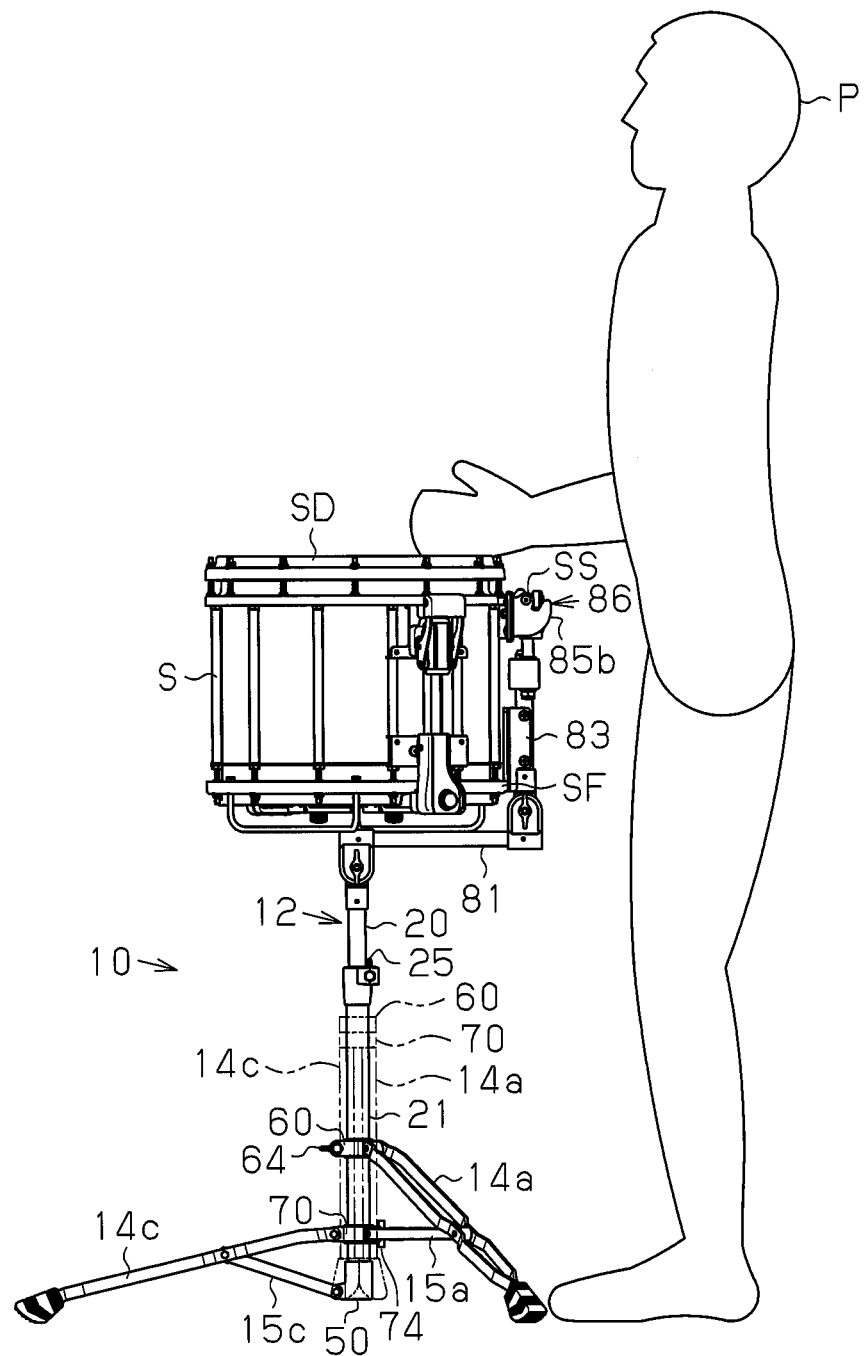
FIG. 5 is a side view showing the drum stand placed on a flat ground.
Figure 6:
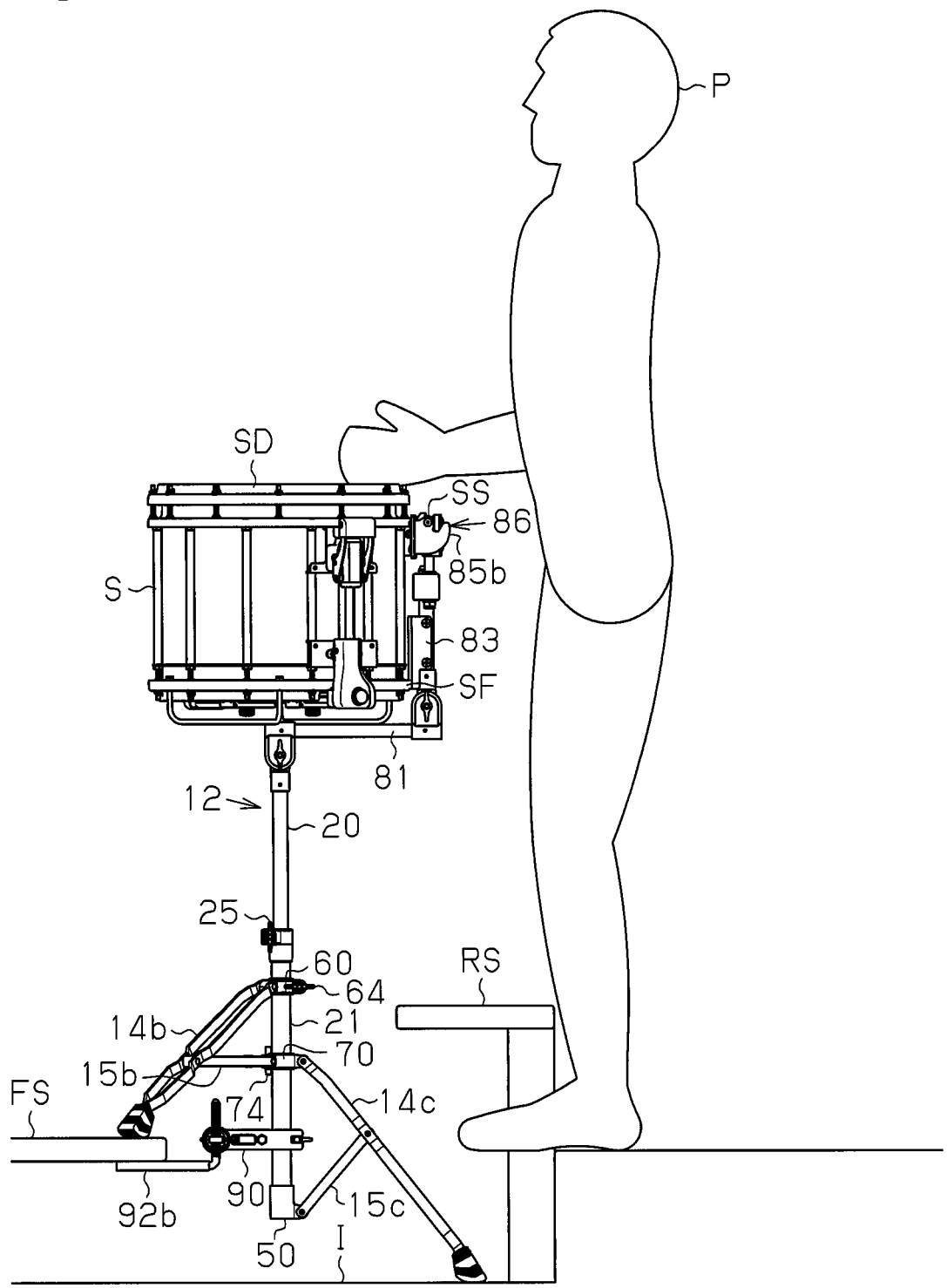
FIG. 6 is a side view illustrating the drum stand placed across a step.

An L-shaped arm 18 is coupled to the upper end of the upper pipe 20. The arm 18 includes a support bar 81, which extends laterally from the upper end of the center pipe 12, and a stopper 83, which is coupled to the distal end of the support bar 81 via an angle adjuster 82. A coupling device 86, which includes a pair of hooks 85a, 85b, is coupled to the upper end of the stopper 83 via a support 84. A rectangular bridge member 87 is secured to the hooks 85a, 85b to link the hooks 85a, 85b. As shown in FIGS. 5 and 6, a coupling shaft SS of a snare drum S is fitted in the hooks 85a, 85b so that the snare drum S is coupled to the drum stand 10 via the coupling device 86.

As shown in FIG. 1, lock levers 88a, 88b, which serve as securing means, are pivotally supported by the hooks 85a, 85b. When the lock levers 88a, 88b are switched to the lock position shown by the chain double-dashed lines, the coupling shaft SS of the snare drum S is retained not to be disengaged from the hooks 85a, 85b. When the lock levers 88a, 88b are switched to the unlock position shown by the solid lines, the coupling shaft SS in the hooks 85a, 85b is unlocked, and the snare drum S becomes able to be removed from the drum stand 10.

Figure 3:
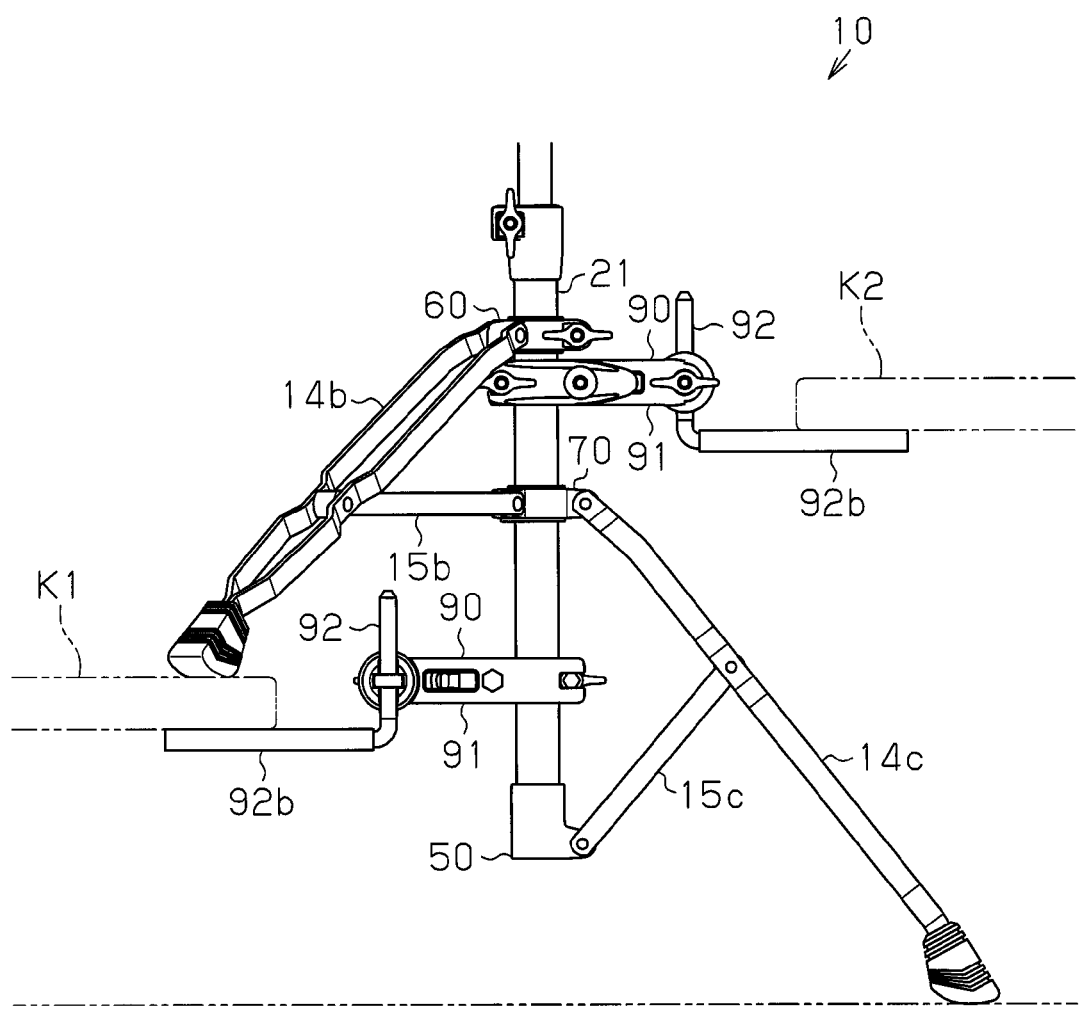
FIG. 3 is a partial side view illustrating the lower structure of the drum stand on which an overturning prevention means is mounted.

As shown in FIG. 3, the drum stand 10 may be used with an overturning prevention means 90 fitted to the lower pipe 21. The overturning prevention means 90 retains the drum stand 10 that is arranged across a step and prevents the drum stand 10 from falling onto the first legs 14a, 14b, onto the first leg 14a and the second leg 14c, or onto the first leg 14b and the second leg 14c. The overturning prevention means 90 is fitted to the lower pipe 21 at least one of positions between the first movable collar 60 and the second movable collar 70, and between the second movable collar 70 and the fixed collar 50. The overturning prevention means 90 includes a clamp 91, which is detachable with respect to the lower pipe 21, and an L-shaped rod 92.

Figure 4:
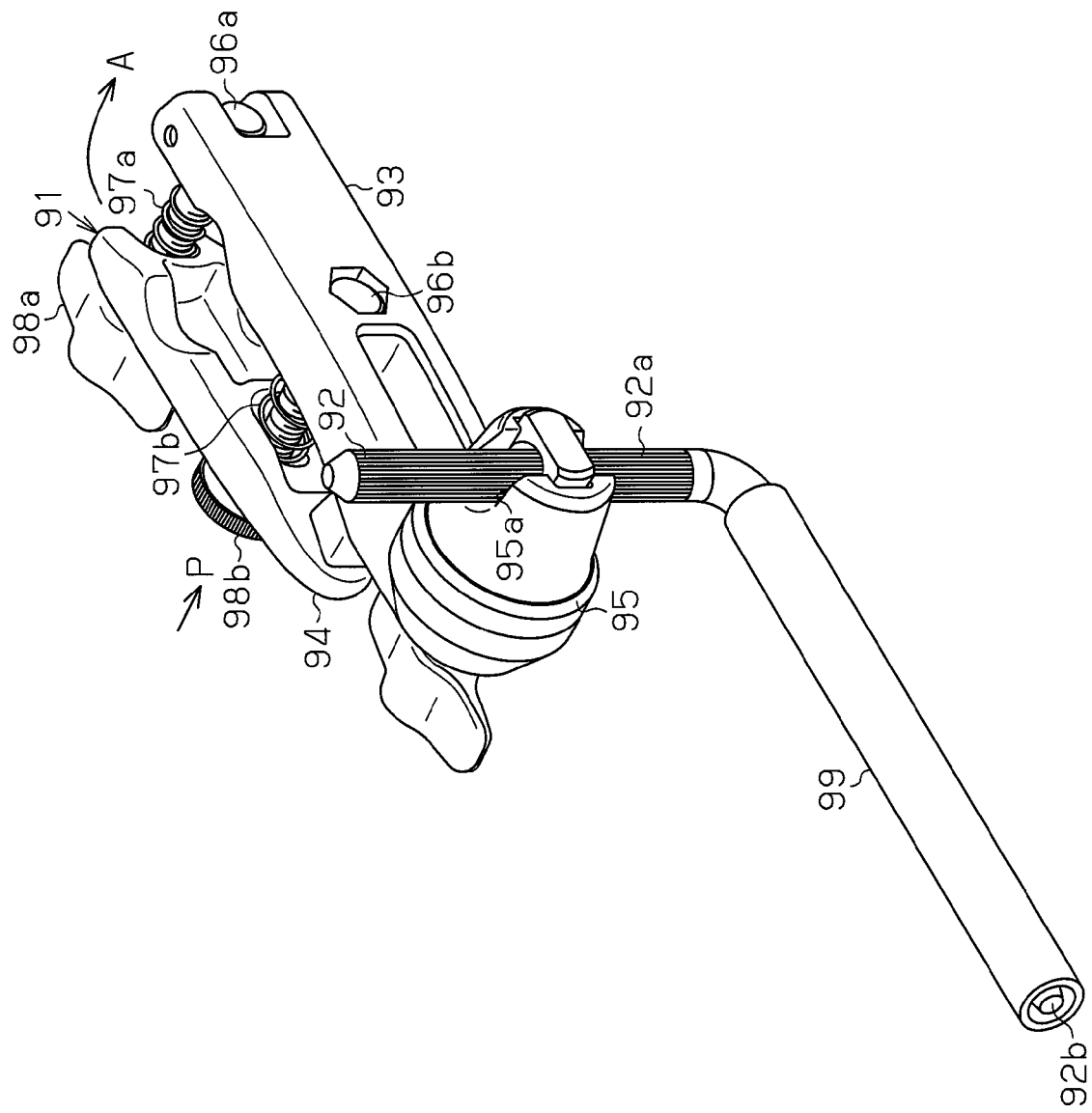
FIG. 4 is a perspective view illustrating the entire overturning prevention means.

As shown in FIG. 4, the clamp 91 includes a clamp main body 93, a clamp piece 94, which clamps the lower pipe 21 with the clamp main body 93, and an angle adjuster 95, which is rotationally attached to the end of the clamp main body 93. The clamp piece 94 is coupled to the clamp main body 93 via a pair of bolts 96a, 96b to be able to separate from the clamp main body 93. Springs 97a, 97b are respectively mounted on the threaded portions of the bolts 96a, 96b in a state where the springs 97a, 97b are compressed by the clamp main body 93 and the clamp piece 94. The bolt 96a to which a T-nut 98a is screwed is rotationally coupled to the end of the clamp main body 93 via a pin. The bolt 96b to which a disk nut 98b is screwed is inserted in a bore of the clamp main body 93 toward a bore of the clamp piece 94.

When the T-nut 98a screwed to the bolt 96a is loosened, the bolt 96a becomes rotatable with respect to the clamp main body 93 in the direction A shown in FIG. 4. At this time, when the proximal end of the clamp piece 94 is pressed in the direction P shown in FIG. 4 so that the distal end of the clamp piece 94 is separated from the clamp main body 93, the clamp 91 that is fastened to the lower pipe 21 is released. Thus, the overturning prevention means 90 becomes able to be removed from the lower pipe 21. When the bolt 96a is returned to the position shown in FIG. 4, and the T-nut 98a screwed to the bolt 96a is fastened, the lower pipe 21 is fastened by the clamp 91 so that the overturning prevention means 90 is secured to the lower pipe 21.

The rod 92 includes a stationary portion 92a, which is secured to the angle adjuster 95, and a contact portion 92b, which is bent at a right angle with respect to the stationary portion 92a and is longer than the stationary portion 92a. The contact portion 92b is a portion that contacts structures K1, K2 that exist in the vicinity of the location of the drum stand 10. A cover 99 is mounted around the entire contact portion 92b from the proximal end to the distal end of the contact portion 92b. The cover 99 is formed of material having cushioning properties such as a rubber or a sponge material. The rod 92 is fitted to a mounting hole 95a of the angle adjuster 95 with the stationary portion 92a arranged along the axial direction of the lower pipe 21, and the contact portion 92b arranged in the direction perpendicular to the axis of the lower pipe 21.

The operations of the drum stand 10 will now be described with reference to FIGS. 5 and 6. In this embodiment, as for the description of the case in which the drum stand 10 is placed across a step, a case in which the drum stand 10 is placed at the spectators' stand of the stadium will be described as follows. At the spectators' stand, seats are arranged in rows forming stairs, and an aisle I is formed between a front seat FS and a rear seat RS at a position lower than the front seat FS.

When arranging the drum stand 10 on a flat ground, first, the first movable collar 60 and the second movable collar 70 are manipulated to open the legs 14a, 14b, 14c and the stays 15a, 15b, 15c that are closed as shown by the chain double-dashed line in FIG. 5 to the state as shown by the solid line in FIG. 5. Then, the drum stand 10 is placed with the single second leg 14c oriented forward of the player P, and the two first legs 14a, 14b oriented rearward. Subsequently, the heights of the first movable collar 60 and the second movable collar 70 are adjusted such that the heights of the distal ends of the first legs 14a, 14b and the second leg 14c are the same. Then, the T-nut 64 and the T-bolt 74 are fastened to fix the heights of the first movable collar 60 and the second movable collar 70. The second movable collar 70 is arranged in the vicinity of the fixed collar 50 through the above set of operations. Thus, the second leg 14c is opened with respect to the lower pipe 21 by a large amount and is retained in such a manner that the second leg 14c extends forward by a large amount. The first legs 14a, 14b are opened with respect to the lower pipe 21 at angles smaller than the opening angle of the second leg 14c and are retained in such a manner that the first legs 14a, 14b extend rearward by a small amount. Subsequently, in order to arrange a head SD of the snare drum S at a position that is easy to play, the T-nut 25 is manipulated to adjust the height of the entire drum stand 10. Since the overturning prevention means 90 is not used when placing the drum stand 10 on the flat ground, the overturning prevention means 90 is removed from the lower pipe 21.

When placing the drum stand 10 across a step, first, the legs 14a, 14b, 14c, and the stays 15a, 15b, 15c are opened as described above. Then, the drum stand 10 is placed between the front seat FS and the rear seat RS with the two first legs 14a, 14b oriented forward of the player P, and the single second leg 14c oriented rearward as shown in FIG. 6. Subsequently, the heights of the first movable collar 60 and the second movable collar 70 are adjusted such that the heights of the distal ends of the first legs 14a, 14b become equal to the height of the front seat FS, and the height of the distal end of the second leg 14c becomes equal to the height of the aisle I. Thereafter, the T-nut 64 and the T-bolt 74 are fastened to fix the heights of the first movable collar 60 and the second movable collar 70. Through the above set of operations, the first movable collar 60 is arranged in the vicinity of the upper end of the lower pipe 21, and the second movable collar 70 is arranged at the middle position between the first movable collar 60 and the fixed collar 50. Accordingly, the two first legs 14a, 14b are retained in a state in which the first legs 14a, 14b are opened with respect to the lower pipe 21 at an angle based on the position of the first movable collar 60 with respect to the second movable collar 70. The single second leg 14c is retained in a state in which the second leg 14c is opened with respect to the lower pipe 21 at an angle based on the position of the second movable collar 70 with respect to the fixed collar 50.

Subsequently, the overturning prevention means 90 is fitted to the lower pipe 21 between the second movable collar 70 and the fixed collar 50. At this time, the mounting position of the overturning prevention means 90 with respect to the lower pipe 21, that is, the height of the overturning prevention means 90 is adjusted to a position where the contact portion 92b of the rod 92 abuts against the lower surface of the front seat FS. Also, in this state, the angular position of the overturning prevention means 90 about the axis of the lower pipe 21 is adjusted by manually turning the overturning prevention means 90 about the axis of the lower pipe 21. Furthermore, the orientation of the contact portion 92b of the rod 92 is adjusted to be parallel to the lower surface of the front seat FS by rotating the angle adjuster 95. Through this set of operations, the front seat FS is sandwiched between the contact portion 92b of the rod 92 and the first legs 14a, 14b.

In this case, since the rod 92 contacts the structure, which is the front seat FS in this embodiment, on the same side of the drum stand 10 as the first legs 14a, 14b, the drum stand 10 is prevented from falling onto the first legs 14a, 14b of the drum stand 10, that is, toward the field of the stadium (the left side in FIG. 6). The drum stand 10 is also prevented from falling toward a direction substantially perpendicular to the sheet surface of FIG. 6, that is, onto the first leg 14a or the second leg 14c, or onto the first leg 14b or the second leg 14c.

Also, in this case, since the two first legs 14a, 14b are arranged on the front seat FS, the two first legs 14a, 14b support the drum stand 10 in the direction of the first legs 14a, 14b in a stable manner. Furthermore, since the snare drum S is retained with its axis aligned with the axis of the center pipe 12, the upright posture of the drum stand 10 is also stable. Furthermore, since the overturning prevention means 90 is mounted on the lower pipe 21, and the drum stand 10 is retained in the vicinity of its center of gravity, the drum stand 10 is placed in a more stable manner.

Unlike the above-mentioned case, the overturning prevention means 90 may be fitted to the lower pipe 21 only between the first movable collar 60 and the second movable collar 70 according to the location of the drum stand 10 and the shape of the seats FS, RS. In this case also, the mounting position of the overturning prevention means 90 with respect to the lower pipe 21 is adjusted such that the contact portion 92b of the rod 92 is pressed against the rear seat RS from below by performing the same operations as the case in which the overturning prevention means 90 is fitted between the second movable collar 70 and the fixed collar 50. Accordingly, the rod 92 contacts the rear seat RS on the same side of the drum stand 10 as the second leg 14c. Thus, the drum stand 10 is prevented from falling onto the first leg 14a or the second leg 14c, or onto the first leg 14b or the second leg 14c in addition to the direction onto the first legs 14a, 14b of the drum stand 10.

The present embodiment has the following advantages.

(1) The first legs 14a, 14b are pivotally coupled to the first movable collar 60. The first stays 15a, 15b and the second leg 14c are pivotally coupled to the second movable collar 70. Also, the proximal end of the second stay 15c is pivotally coupled to the fixed collar 50. With this structure, the second leg 14c is selectively opened and closed with respect to the center pipe 12, and the height of the second leg 14c is adjusted by changing the position of the second movable collar 70 with respect to the fixed collar 50. Also, the first legs 14a, 14b are selectively opened and closed with respect to the center pipe 12, and the heights of the first legs 14a, 14b are adjusted by changing the position of the first movable collar 60 with respect to the second movable collar 70. In this manner, the first legs 14a, 14b and the second leg 14c are selectively opened and closed with respect to the center pipe 12, and the heights of the first legs 14a, 14b and the second leg 14c are adjusted by only manipulating the first movable collar 60 and the second movable collar 70 fitted to the center pipe 12 to adjust the heights. Thus, in addition to the simple manipulation, the heights of the legs 14a, 14b, 14c are easily adjusted according to the location of the drum stand 10.

(2) The drum stand 10 has the tripod structure including the two first legs 14a, 14b arranged adjacent to each other, and the single second leg 14c. With this structure, the two first legs 14a, 14b are coupled to the first movable collar 60 arranged at a higher position among the two movable collars 60, 70. Thus, the two first legs 14a, 14b can be arranged at a position higher than the second leg 14c by manipulating the first movable collar 60 and the second movable collar 70. Therefore, when placing the drum stand 10 across a step, the two first legs 14a, 14b can be arranged on the higher surface forming the step. This allows the drum stand 10 to be supported in the direction of the first legs 14a, 14b in a stable manner.

(3) The drum stand 10 can be used with the overturning prevention means 90 fitted to the lower pipe 21. With this structure, even in the case in which the drum stand 10 is placed across a step, the rod 92 of the overturning prevention means 90 contacts the structure K1, K2 in the vicinity of the location of the drum stand 10 so that the drum stand 10 is retained not to fall over. Also, since the overturning prevention means 90 is mounted on the lower pipe 21, the drum stand 10 is retained in the vicinity of its center of gravity. Thus, the drum stand 10 is placed in a more stable manner by using the overturning prevention means 90.

(4) When the overturning prevention means 90 is fitted to the lower pipe 21 between the second movable collar 70 and the fixed collar 50 as shown in the left side of FIG. 3, the contact portion 92b of the rod 92 is pressed against the structure K1, on which the first legs 14a, 14b are arranged, from below. Accordingly, the structure K1 is sandwiched between the contact portion 92b of the rod 92 and the first legs 14a, 14b. In this case, since the rod 92 of the overturning prevention means 90 contacts the structure K1 on the same side of the drum stand 10 as the first legs 14a, 14b, the drum stand 10 is prevented from falling onto the first legs 14a, 14b.

(5) When the overturning prevention means 90 is fitted to the lower pipe 21 between the first movable collar 60 and the second movable collar 70 as shown in the right side of FIG. 3, the contact portion 92b of the rod 92 is pressed against the structure K2 arranged above the second leg 14c from below. In this case, since the rod 92 of the overturning prevention means 90 contacts the structure K2 on the same side of the drum stand 10 as the second leg 14c, the drum stand 10 is prevented from falling onto the first legs 14a, 14b.

(6) The overturning prevention means 90 has the clamp 91 that is detachable with respect to the lower pipe 21. With this structure, the overturning prevention means 90 can be fitted to the lower pipe 21 or the overturning prevention means 90 can be detached from the lower pipe 21 according to where the drum stand 10 is to be placed. That is, the overturning prevention means 90 can be removed from the lower pipe 21 in advance such that the overturning prevention means 90 does not interfere when selectively opening and closing the first legs 14a, 14b and the second leg 14c. Also, since the clamp 91 is detachable from the lower pipe 21, the mounting position of the overturning prevention means 90 with respect to the lower pipe 21, that is, the height of the overturning prevention means 90, and the angular position of the overturning prevention means 90 around the axis of the lower pipe 21 are easily adjusted.

Also, the rod 92 is fitted to the mounting hole 95a of the angle adjuster 95. With this structure, the height range in which the drum stand 10 can be arranged with respect to the structures K1, K2 is increased by vertically moving the rod 92 mounted on the angle adjuster 95, or reversing the rod 92 before mounting the rod 92 in the mounting hole 95a. Thus, the drum stand 10 can be placed with respect to the structures K1, K2 having various shapes and sizes.

(8) The rod 92 is fitted to the mounting hole 95a of the angle adjuster 95 with the contact portion 92b oriented in the direction perpendicular to the axis of the lower pipe 21. With this structure, in a state in which the rod 92 is pressed against the structure K1, on which the first legs 14a, 14b are mounted, or the structure K2, which is arranged above the second leg 14c, the rod 92 can slide along the axial direction of the contact portion 92b with respect to the structures K1, K2. Thus, the position of the drum stand 10 in the horizontal direction with respect to the structures K1, K2 can be determined while retaining the drum stand 10 not to fall over.

(9) As shown in FIGS. 5 and 6, the snare drum S is retained such that the axis of the snare drum S is aligned with the axis of the center pipe 12 in a state in which the snare drum S is coupled to the drum stand 10. Also, in this state, a lower hoop SF of the snare drum S is abut against the lower front surface of the stopper 83 so that the snare drum S is retained such that the head SD is horizontal. In this case, since the upright posture of the drum stand 10 is stabilized, the snare drum S is supported in a more stable manner.

(10) The lock levers 88a, 88b, which serve as the securing means, are pivotally supported by the hooks 85a, 85b, respectively. With this structure, the snare drum S is locked on the drum stand 10 not to fall off the drum stand 10 by switching the lock levers 88a, 88b to the lock position.

The present embodiment may be modified as follows.

Figure 7A:
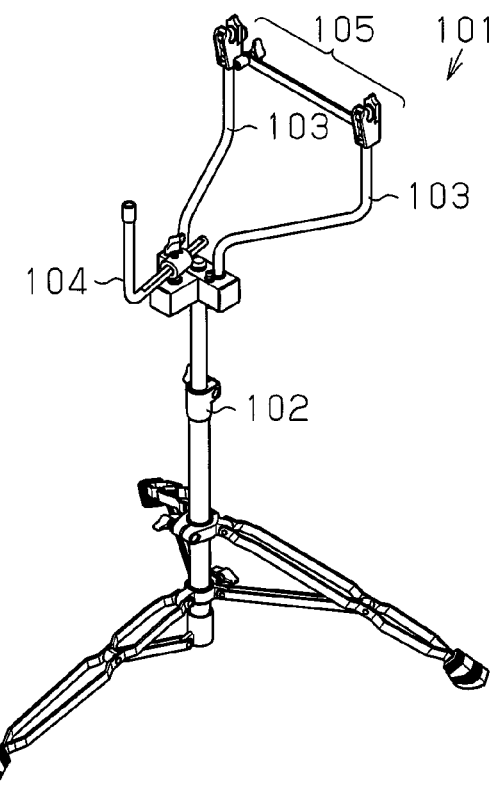
FIG. 7A is a perspective view illustrating a tenor drum stand employing the tripod structure of the drum stand according to the present invention.

In the present embodiment, the tripod structure of the drum stand 10 according to the present invention may be applied to a tenor drum stand used for mounting a tenor drum. As shown in FIG. 7A, a tenor drum stand 101 includes a center pipe 102, a pair of movable rods 103, which is selectively opened and closed about the axis of the center pipe 102, a fixed rod 104, which is fixed at the upper end of the center pipe 102, and a coupling device 105 to which the tenor drum is coupled.

Figure 7B:
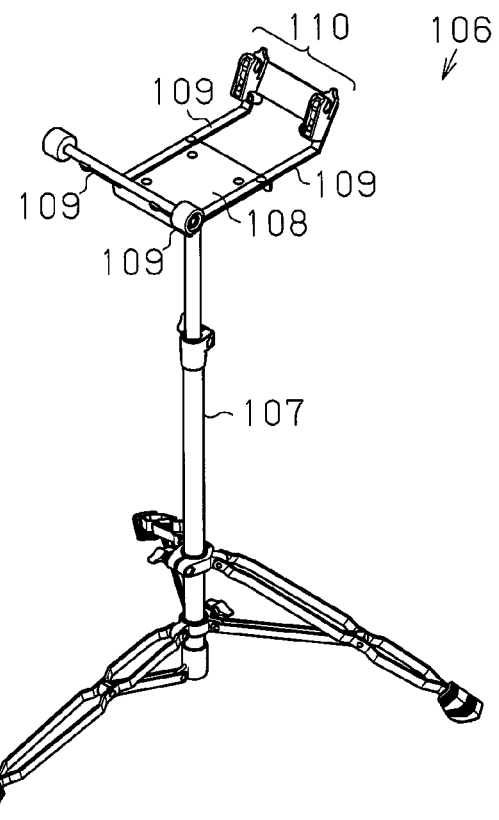
FIG. 7B is a perspective view illustrating a bass drum stand employing the tripod structure of the drum stand according to the present invention.

Furthermore, the tripod structure of the drum stand 10 according to the present invention may be applied to a bass drum stand used for mounting a bass drum. As shown in FIG. 7B, a bass drum stand 106 includes a center pipe 107, a flat plate 108, which is fixed on the upper end of the center pipe 107, four frames 109, which are fixed on the flat plate 108, and a coupling device 110 to which the bass drum is coupled.

Figure 8:
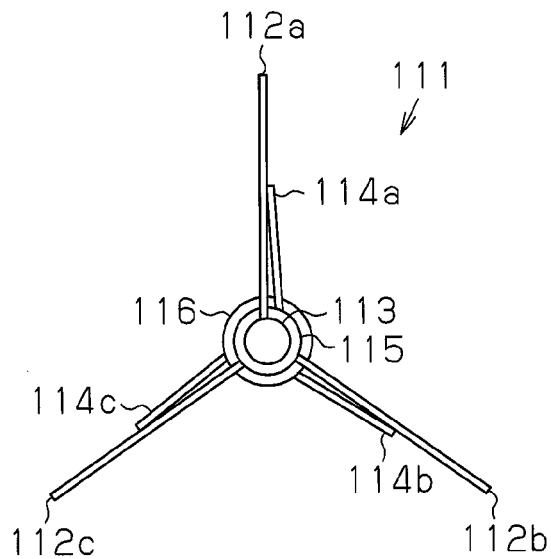
FIG. 8 is a schematic top view illustrating the tripod structure of a drum stand according to a modified embodiment.

In the present embodiment, a drum stand 111 may have a tripod structure formed by a single first leg 112a and two second legs 112b, 112c as shown in FIG. 8. In this case, the single first leg 112a is pivotally coupled to a first movable collar 113, and a single first stay 114a coupled to the first leg 112a is pivotally coupled to a second movable collar 115. Also, the two second legs 112b, 112c are pivotally coupled to the second movable collar 115, and two second stays 114b, 114c respectively coupled to the second legs 112b, 112c are pivotally coupled to a fixed collar 116.

Figure 9A:
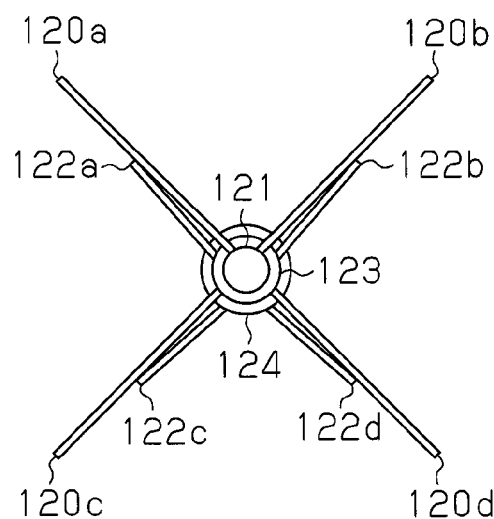
FIG. 9A is a schematic top view illustrating a four-legged structure of a drum stand according to a modified embodiment.
Figure 9B:
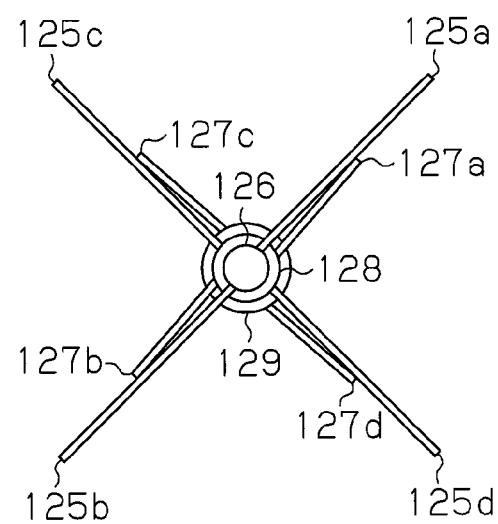
FIG. 9B is a schematic top view illustrating the four-legged structure of a drum stand according to a modified embodiment.
Figure 10:
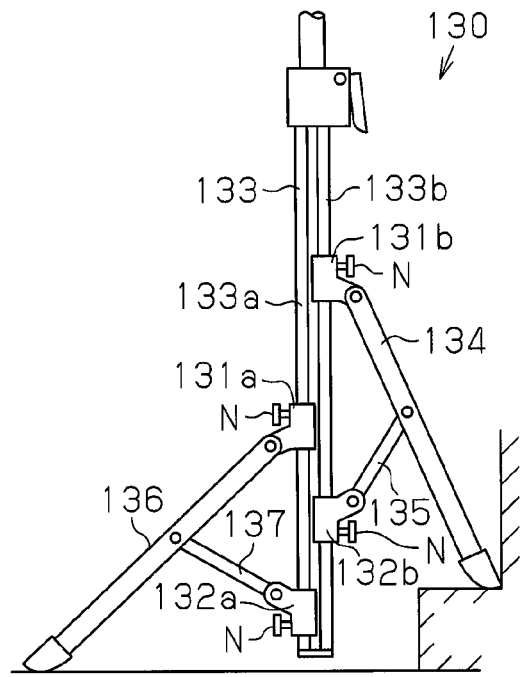
FIG. 10 is a side view illustrating the lower structure of a conventional drum stand.
Figure 11:
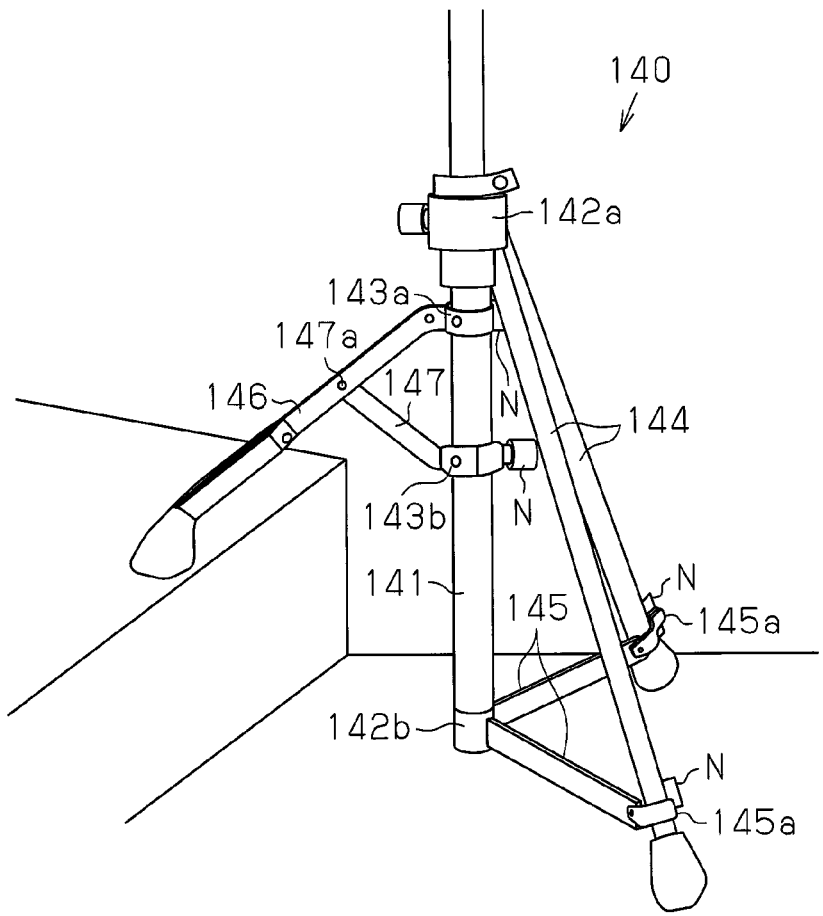
FIG. 11 is a perspective view illustrating the lower structure of a conventional drum stand.
Figure 12:
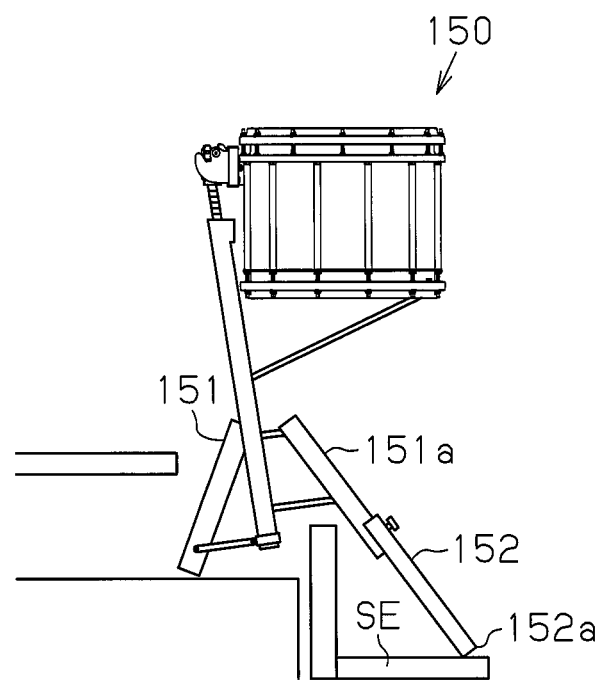
FIG. 12 is a side view illustrating a conventional drum stand.

In the present embodiment, the drum stand 10 may have a four-legged structure including two first legs 120a, 120b and two second legs 120c, 120d as shown in FIGS. 9A and 9B. In this case, for example, as shown in FIG. 9A, the two first legs 120a, 120b arranged adjacent to each other are pivotally coupled to a first movable collar 121, and two first stays 122a, 122b respectively coupled to the first legs 120a, 120b are pivotally coupled to a second movable collar 123. Also, the two second legs 120c, 120d arranged adjacent to each other are pivotally coupled to the second movable collar 123, and two second stays 122c, 122d respectively coupled to the second legs 120c, 120d are pivotally coupled to a fixed collar 124.

Furthermore, as shown in FIG. 9B, two first legs 125a, 125b arranged opposite to each other are pivotally coupled to a first movable collar 126, and two first stays 127a, 127b respectively coupled to the first legs 125a, 125b are pivotally coupled to a second movable collar 128. Also, two second legs 125c, 125d arranged opposite to each other are pivotally coupled to the second movable collar 128, and two second stays 127c, 127d respectively coupled to the second legs 125c, 125d are pivotally coupled to a fixed collar 129.

In the present embodiment, the leg structure of the drum stand 10 may be changed to any leg structure other than the tripod structure and the four-legged structure by increasing the number of the first legs 14a, 14b, the second leg 14c, the first stays 15a, 15b, and the second stay 15c.

In the present embodiment, the present invention may be embodied in a musical instrument stand used for mounting a percussion instrument other than the marching drum, for example, a xylophone or a metallophone.

In the present embodiment, the first stays 15a, 15b may be slidably coupled to the first legs 14a, 14b, respectively. Similarly, the second stay 15c may be slidably coupled to the second leg 14c.

The invention claimed is:

1. A musical instrument stand used for mounting a musical instrument, comprising:
a center pipe extending in a vertical direction;
a lower collar fitted to a lower end of the center pipe;
a first movable collar slidably fitted to the center pipe;
a second movable collar slidably fitted to the center pipe, the second movable collar being arranged below the first movable collar;
at least three legs assembled on the center pipe to be selectively opened and closed; and
at least three stays respectively coupled to the legs, wherein
the at least three legs include a leg of a first type, which is pivotally coupled to the first movable collar, and a leg of a second type, which is pivotally coupled to the second movable collar,
the at least three stays include a stay of a first type, which is coupled to the leg of the first type and is pivotally coupled to the second collar, and
a stay of a second type is coupled to the leg of the second type and is pivotally coupled to the lower collar,
the heights of the first movable collar and the second movable collar are adjustable such that the musical instrument stand selectively has at least a first configuration in which the heights of the distal ends of the leg of the first type and the leg of the second type are the same and a second configuration in which the height of the distal end of the leg of the first type differs from that of the leg of the second type.

2. The musical instrument stand according to claim 1, wherein the musical instrument stand includes two of the legs of the first type.

3. The musical instrument stand according to claim 2, wherein the legs of the first type are arranged adjacent to each other.

4. The musical instrument stand according to claim 1, further comprising an overturning prevention device, which is fitted to the center pipe and prevents the musical instrument stand from falling over, wherein the overturning prevention device is adapted to engage a structure in the vicinity of the location of the musical instrument stand.

5. The musical instrument stand according to claim 4, wherein the overturning prevention device is fitted to the center pipe between the second movable collar and the lower collar and is shaped to engage a structure on which the leg of the first type is mounted to prevent the musical instrument stand from falling over.

6. The musical instrument stand according to claim 4, wherein the overturning prevention device is fitted to the center pipe between the first movable collar and the second movable collar and is shaped to engage a structure arranged above the second leg to prevent the musical instrument stand from falling over.

7. The musical instrument stand according to claim 4, wherein the overturning prevention device includes a rod extending in a direction perpendicular to an axis of the center pipe.

8. The musical instrument stand according to claim 4, wherein the overturning prevention device includes a clamp, which is attachable and detachable with respect to the center pipe.

9. The musical instrument stand according to claim 1, wherein securing apparatus is provided on an upper end of the center pipe to secure the musical instrument on the musical instrument stand.

10. The musical instrument stand according to claim 1, wherein the musical instrument stand is a marching drum stand used for mounting a marching drum.

11. A musical instrument stand used for mounting a musical instrument, comprising:
    a center pipe extending in a vertical direction;
    at least three legs assembled on the center pipe to be selectively opened and closed, the position in height of the certain leg among the at least three legs being capable of being adjusted independently of the other legs;
    at least three stays respectively coupled to the legs; and
    an overturning prevention device fitted to the center pipe that prevents the musical instrument stand from falling over,
    wherein the overturning prevention device is adapted to engage a structure in the vicinity of the location of the musical instrument stand to prevent the musical instrument stand from falling over.

\* \* \* \* \*